F. KNAUST.
GAMBREL.
APPLICATION FILED OCT. 12, 1909.
962,358.
Patented June 21, 1910.
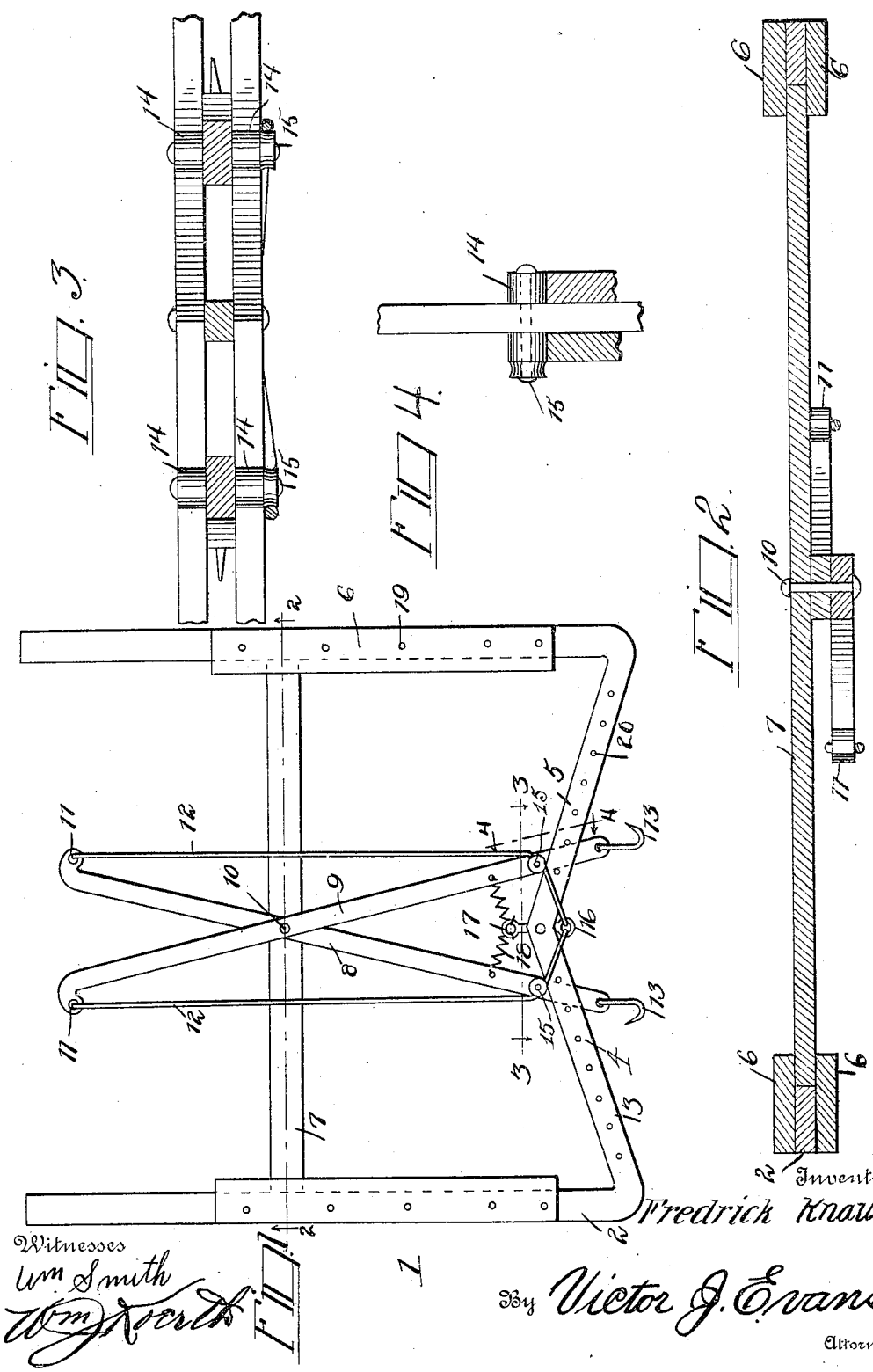
Inventor
Fredrich Knaust.
By Victor J. Evans
Attorney
Witnesses
Wm. Smith
Wm. Roerth

UNITED STATES PATENT OFFICE.

FREDRICK KNAUST, OF JERSEY CITY, NEW JERSEY.

GAMBREL.

962,358.  Specification of Letters Patent.  Patented June 21, 1910.

Application filed October 12, 1909. Serial No. 522,219.

*To all whom it may concern:*

Be it known that I, FREDRICK KNAUST, a citizen of the United States, residing at Jersey City, in the county of Hudson and State of New Jersey, have invented new and useful Improvements in Gambrels, of which the following is a specification.

This invention relates to improvements in gambrels and the primary object of the invention is to provide a device of this character whereby the arms supporting the carcass of an animal are so constructed and arranged as to divide the weight of the carcass equally upon both of its arms.

With the above and other objects in view, which will appear as the description progresses the invention resides in the novel construction and combination of elements hereinafter fully described and claimed.

In the accompanying drawings, Figure 1 is a side elevation of the device constructed in accordance with the present invention. Fig. 2 is a longitudinal sectional view upon the line 2—2 of Fig. 1 and looking in the direction of the arrow. Fig. 3 is a similar sectional view upon the line 3—3 of Fig. 1. Fig. 4 is a vertical sectional view upon the line 4—4 of Fig. 1.

In the accompanying drawing the numeral 1 designates the gambrel proper. This gambrel comprises essentially a substantially U-shaped frame 2, the lower or connecting member 3 of which is bent upwardly so as to provide oppositely inclined tracks or members designated by the numerals 4 and 5. The side arms of the U-shaped member 2 are provided with plates 6 upon their opposite faces. These plates 6 are extended a suitable distance beyond the inner edges of the said side arms so as to provide a passage or way for the longitudinally extending bar 7. The bar 7 has centrally connected therewith a pair of arms, designated by the numerals 8 and 9 each pivotally connected together and to the bar 7 as at 10. The upper ends of these bars 8 and 9 are offset as at 11 and are provided with suitable openings adapted for the reception of flexible members 12. The lower extremities of the arms 8 and 9 are provided with suitable hooks 13 upon which the carcass of the animal is suspended. The arms 8 and 9 are also provided upon their opposite faces with suitable rollers 14 which bear upon the inclined edges 4 and 5 of the connecting member 3 of the U-shaped frame 2, while projecting beyond the said rollers 14 upon one of the faces of the arms 8 and 9 are pulley members 15 over which the flexible elements 12 are adapted to travel and the said elements have their ends connected with an eye 16 provided upon the connecting member 3 of the frame. The apex of the oppositely inclined edges 4 and 5 of the connecting member 3 is also provided with an upstanding eye 17 and the said eye 17 is adapted for the reception of a pair of helical springs 18 each of which connects with the arms 8 and 9.

When the carcass is suspended upon the hooks 13 it will be noted that the weight of the said carcass will cause the rollers 14 to travel upon the inclined edges 4 and 5 of the member 3, thus causing the lower ends of the members 8 and 9 to expand and to draw the bar 7 downwardly within ways provided by the plate 6 and it will be noted that the flexible members 12 effectively compensate for the weight carried by the hooks 13 and clearly divides the weight between the two members 8 and 9. When the weight is relieved from the hooks 13 the helical springs 18 are of a sufficient tension to draw the rods 8 and 9 upwardly upon their inclined tracks to their initial position. By reference to Fig. 1 of the drawings it will be noted that the plate 6 as well as the members 4 and 5 of the frame 3 are provided with spaced openings 19 and 20 and these openings are adapted for the reception of a suitable pintle whereby the downward movement of the bar 7 and the spreading of the rods 9 and 10 may be limited when desired.

From the above description, taken in connection with the accompanying drawing it will be noted that I have provided a comparatively simple, cheap and thoroughly effective device for the purpose intended and while I have illustrated and described the best embodiment of the improvement as it now appears to me, minor details of construction within the scope of the following claims may be resorted to if desired.

Having thus fully described the invention what is claimed as new is:

1. In a gambrel, a U-shaped frame, the connecting member of the frame being inclined from its center in opposite directions toward the arms of the frame, ways upon the arms of the frame, a bar slidably mounted within the ways, a pair of rods pivotally connected with the bar, rollers upon the rods engaging the inclined edges of the connecting member of the frame, pulleys upon the rods, hooks upon the lower extremities of the rods, flexible members connected with the upper portions of the rods adapted to pass over the pulleys and to be connected with the frame, and resilient members connected with the frame, and the rod and adapted to exert an inner pressure to draw the ends of the rods together.

2. In a device for the purpose set forth, a substantially U-shaped frame, the bottom or connecting bar of the frame being centrally diverged downwardly in opposite directions toward the arms of the frame, plates upon the arms of the frame, said plates being provided with spaced openings, a bar positioned between the plates, a pair of rods pivotally connected with the bar, said rods being provided with rollers bearing upon the inclined member of the frame, the arms of the said inclined member being provided with spaced openings, a pintle for these openings, hooks upon the extremities of the rods, and means for equalizing the weight upon the hooks.

In testimony whereof I affix my signature in presence of two witnesses.

FREDRICK KNAUST.

Witnesses:
WILLIAM SHELLEKE,
WILHELMINA KNAUST.